United States Patent
Guo

(10) Patent No.: US 10,273,815 B2
(45) Date of Patent: Apr. 30, 2019

(54) CURVED BLADE RETENTION SLOT FOR TURBINE BLADE IN A TURBINE DISK

(71) Applicant: United Technologies Corporation, Farmington, CT (US)

(72) Inventor: Changsheng Guo, South Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 9 days.

(21) Appl. No.: 15/498,520

(22) Filed: Apr. 27, 2017

(65) Prior Publication Data

US 2017/0226874 A1 Aug. 10, 2017

Related U.S. Application Data

(62) Division of application No. 12/037,387, filed on Feb. 26, 2008, now Pat. No. 9,662,721.

(51) Int. Cl.
| F03B 3/12 | (2006.01) |
| F01D 5/30 | (2006.01) |
| B23C 3/34 | (2006.01) |
| B24B 19/02 | (2006.01) |
| B23C 5/10 | (2006.01) |

(52) U.S. Cl.
CPC .............. *F01D 5/3007* (2013.01); *B23C 3/34* (2013.01); *B23C 5/10* (2013.01); *B24B 19/022* (2013.01); *B23C 2215/52* (2013.01); *B23C 2220/28* (2013.01); *B23C 2220/366* (2013.01); *F05D 2220/32* (2013.01); *F05D 2240/30* (2013.01); *F05D 2250/71* (2013.01); *Y10T 29/49336* (2015.01)

(58) Field of Classification Search
CPC ............... F01D 5/3007; F05D 2220/32; F05D 2240/30; F05D 2250/71; Y10T 29/49336; B23C 5/10; B23C 3/34; B23C 2220/28; B23C 2215/52; B23C 2220/366; B24B 19/022

See application file for complete search history.

(56) References Cited

U.S. PATENT DOCUMENTS

| 1,719,415 A * | 7/1929 | Back ..................... F01D 5/3007 |
| | | 416/216 |
| 4,604,033 A | 8/1986 | Surdi |
| 4,701,105 A | 10/1987 | Cantor et al. |
| 4,824,328 A | 4/1989 | Pisz et al. |
| 4,827,675 A | 5/1989 | Andrews |
| 5,292,385 A | 3/1994 | Kington |
| 5,403,156 A | 4/1995 | Amess et al. |

(Continued)

*Primary Examiner* — Ryan J. Walters
(74) *Attorney, Agent, or Firm* — Carlson, Gaskey & Olds, P.C.

(57) ABSTRACT

A method of forming a curved slot in a turbine disk includes the steps of forming a pre-slot in the turbine disk and finishing the pre-slot to form a slot that receives a portion of a turbine blade. The turbine disk including a first face, an opposing second face, and an outer perimeter surface extending between the first face and the opposing second face. The pre-slot includes a first curved wall and a second curved wall that each extend between the first face and the opposing second face. An intersection between the outer perimeter surface and each of the first curved wall and the second curved wall is defined by a curved line.

20 Claims, 7 Drawing Sheets

(56) References Cited

U.S. PATENT DOCUMENTS

| | | | |
|---|---|---|---|
| 5,430,936 | A | 7/1995 | Yazdzik, Jr. et al. |
| 5,688,108 | A | 11/1997 | Dierksmeier et al. |
| 5,931,616 | A | 8/1999 | Daub |
| 6,109,877 | A | 8/2000 | Gekht et al. |
| 6,315,298 | B1 | 11/2001 | Kildea et al. |
| 6,471,483 | B2 | 10/2002 | London |
| 6,726,452 | B2 | 4/2004 | Strassberger et al. |
| 6,883,234 | B2 | 4/2005 | Packman et al. |
| 7,153,098 | B2 | 12/2006 | Zabawa |
| 7,303,461 | B1 | 12/2007 | Campomanes et al. |
| 7,781,992 | B2 | 7/2010 | Packman et al. |
| 2003/0138301 | A1 | 7/2003 | Kuerzel |
| 2009/0148296 | A1 | 6/2009 | Barnat et al. |

\* cited by examiner

CURVED BLADE RETENTION SLOT FOR TURBINE BLADE IN A TURBINE DISK

CROSS REFERENCE TO RELATED APPLICATION

This application is a divisional of U.S. application Ser. No. 12/037,387 filed on Feb. 26, 2008.

BACKGROUND OF THE INVENTION

This application relates to a method of generating a curved blade retention slot in a turbine disk of a gas turbine engine.

Gas turbine engines generally include turbine rotors having a plurality of removable turbine blades and a plurality of associated static vanes. The turbine blades are mounted on a turbine disk.

FIGS. 1A and 1B show a front view and a side view, respectively, of a related art turbine disk 46 including a plurality of straight slots 48 for mounting turbine blades to a turbine disk 46. The turbine disk 46 includes a first face 53, an opposing second face 55, and an outer perimeter surface 51 that extends between the first face 53 and the opposing second face 55. The straight slots 48 are generally fabricated using a broaching process. A broaching tool makes a pass through the turbine disk 46 to form an initial pre-slot passage in the turbine disk 46. After forming the straight slots 48, an opening 59 of the straight slots 48 on the outer perimeter surface 51 of the turbine disk 46 is defined by two substantially parallel lines 49. Additional broaching tools pass through the passage, enlarging the passage and defining the profile of each of the straight slots 48. A drawback to the broaching process is that it can only form straight slots.

There is a need in the art for a method of generating a curved blade retention slot in a turbine disk of a gas turbine engine that overcomes the drawbacks and shortcomings of the related art.

SUMMARY OF THE INVENTION

A method of forming a curved slot in a turbine disk includes the steps of forming a pre-slot in the turbine disk and finishing the pre-slot to form a slot that receives a portion of a turbine blade. The turbine disk including a first face, an opposing second face, and an outer perimeter surface extending between the first face and the opposing second face. The pre-slot includes a first curved wall and a second curved wall that each extend between the first face and the opposing second face. An intersection between the outer perimeter surface and each of the first curved wall and the second curved wall is defined by a curved line.

In another exemplary embodiment, a method of forming a turbine disk includes the steps of forming a pre-slot in the turbine disk and finishing the pre-slot to form a slot that receives a base of a turbine blade. The turbine disk includes a first face, an opposing second face, and an outer perimeter surface extends between the first face and the opposing second face. The pre-slot includes a first curved wall and a second curved wall that each extend between the first face and the opposing second face. An intersection between the outer perimeter surface and each of the first curved wall and the second curved wall is defined by a curved line. The method further includes the step of inserting the base of the turbine blade into the slot of the turbine disk, and a shape of the slot corresponds to a shape of the base of the turbine blade.

In another exemplary embodiment, a turbine disk includes a body portion including a first face, an opposing second face, and an outer perimeter extending between the first face and the opposing second face. A slot in the body portion extends between the first face and the opposing second face to receive a portion of a turbine blade. The slot defines an opening on the outer perimeter surface, and the opening is defined by two curved lines.

These and other features of the present invention can be best understood from the following specification and drawings, the following of which is a brief description.

DETAILED DESCRIPTION OF THE PREFERRED EMBODIMENT

Figure 1A:
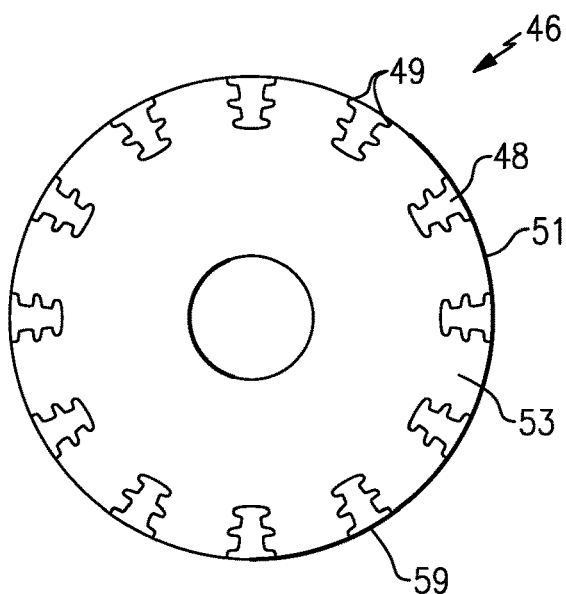
FIG. 1A illustrates a front view of a related turbine disk including a plurality of straight slots.
Figure 1B:
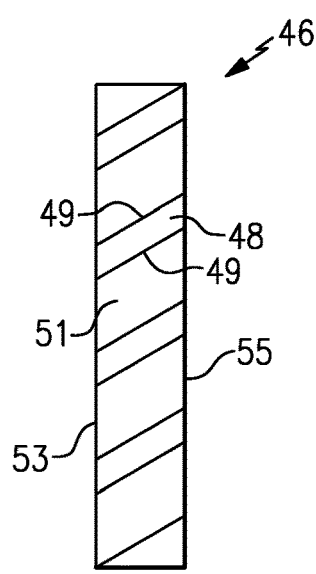
FIG. 1B illustrates a side view of the related turbine disk including a plurality of straight slots.
Figure 2:
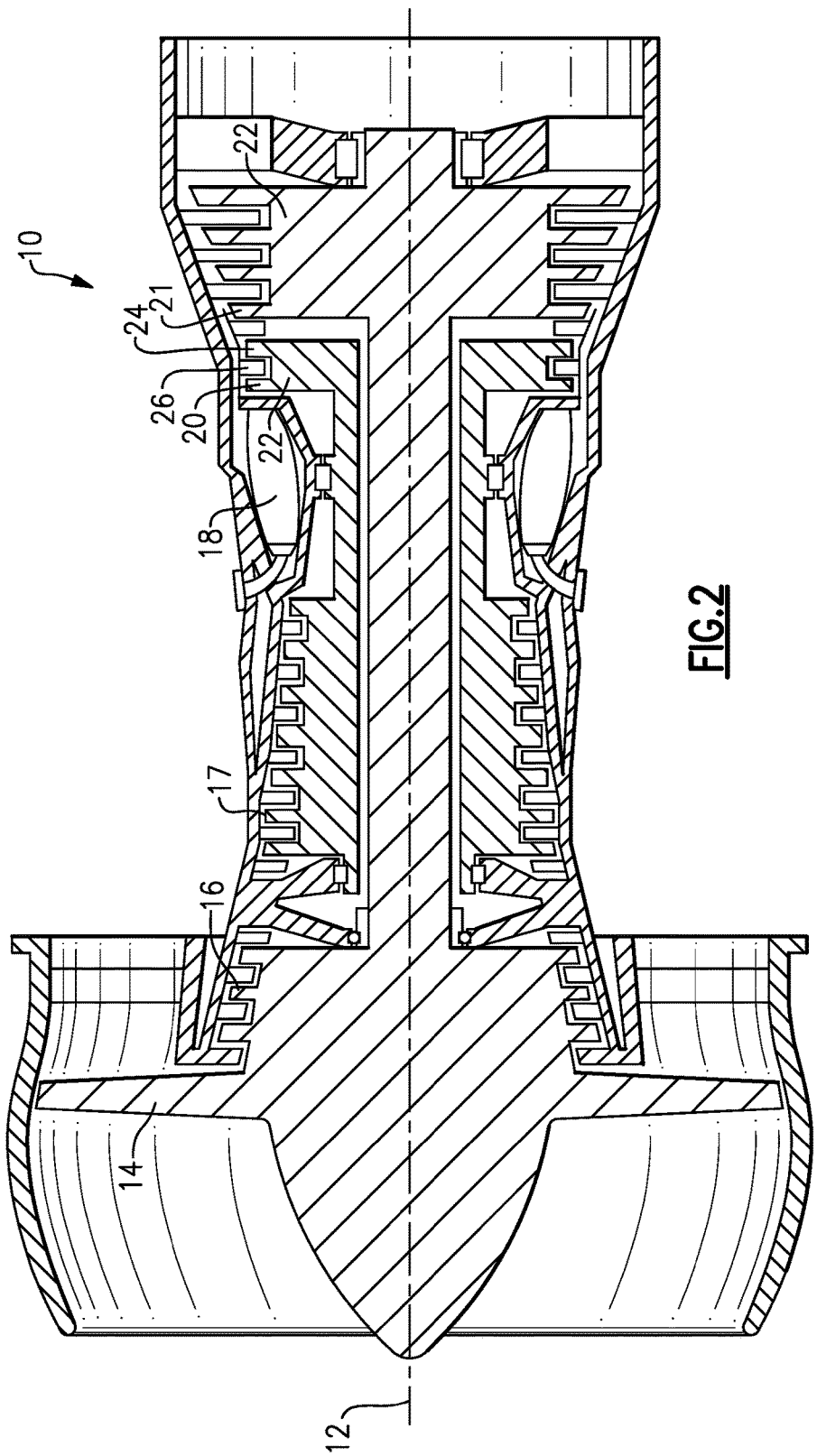
FIG. 2 illustrates a simplified cross-sectional view of a standard gas turbine engine.

As shown in FIG. 2, a gas turbine engine 10, such as a turbofan gas turbine engine, is circumferentially disposed about an engine centerline (or axial centerline axis 12). The gas turbine engine 10 includes a fan 14, compressors 16 and 17, a combustion section 18 and turbines 20 and 21. This application extends to engines without a fan, and with more or fewer sections. As is well known in the art, air is compressed in the compressors 16 and 17, mixed with fuel and burned in the combustion section 18, and expanded in turbines 20 and 21. The turbines 20 and 21 include rotors 22 which rotate in response to the expansion, driving the compressors 16 and 17 and the fan 14. The turbines 20 and 21 include alternating rows of metal rotating airfoils or turbine blades 24 and static airfoils or vanes 26. FIG. 2 is schematic, and the turbine blades 24 and the vanes 26 are removable from the rotors 22. It should be understood that this view is included simply to provide a basic understanding of the sections in a gas turbine engine 10 and not to limit the invention. This invention extends to all types of gas turbine engines for all types of applications.

Figure 3:
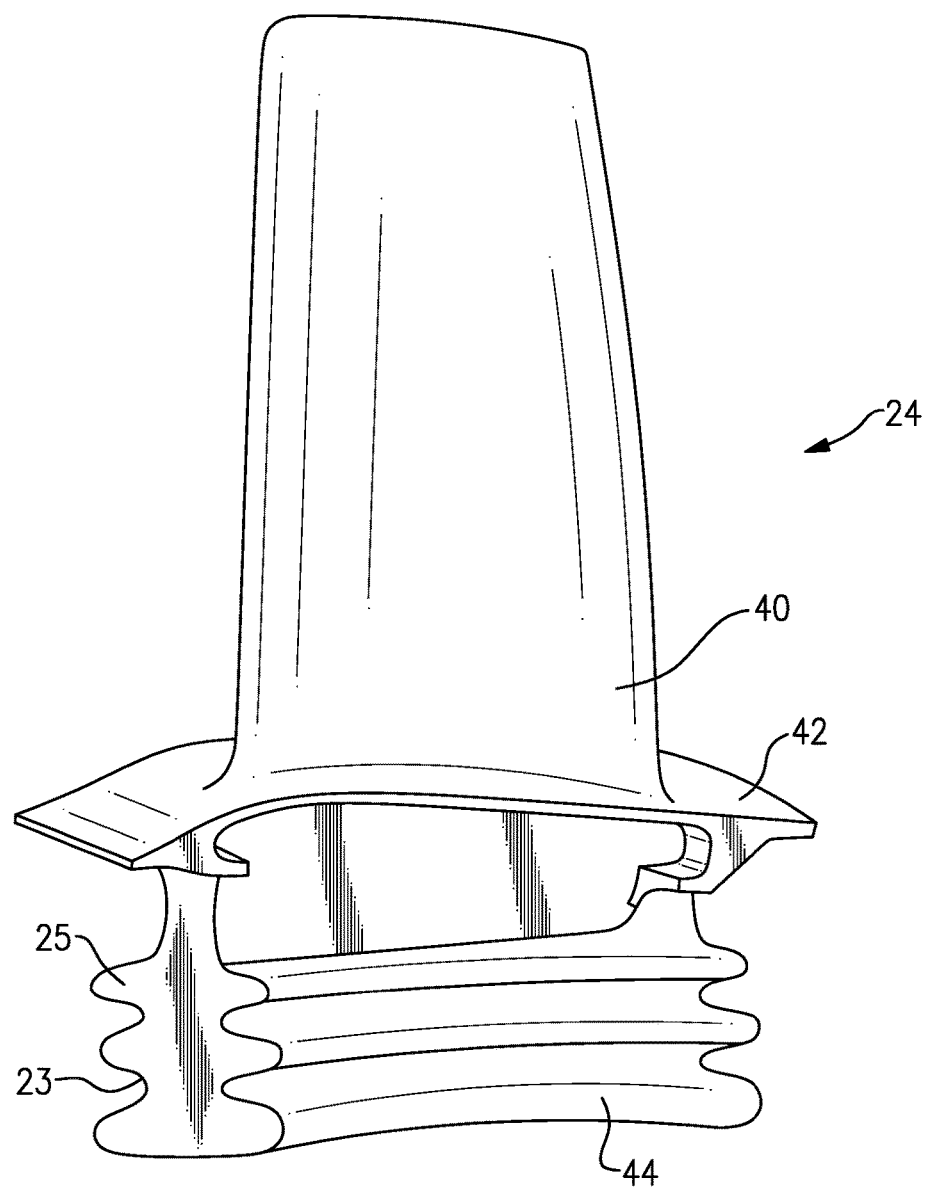
FIG. 3 illustrates a perspective view of a turbine blade.

FIG. 3 shows a turbine blade 24. A platform 42 is provided at a radially inner portion of the turbine blade 24, while an airfoil 40 extends radially (as seen from the axial centerline axis 12) outwardly from the platform 42. A curved base 44 located under the platform 42 has an irregular surface including fingers 25 and grooves 23.

Figure 4A:
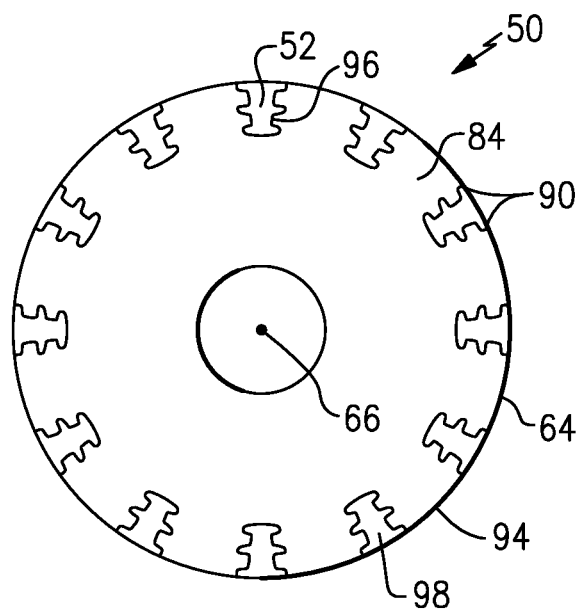
FIG. 4A illustrates a front view of a turbine disk including a plurality of curved slots.
Figure 4B:
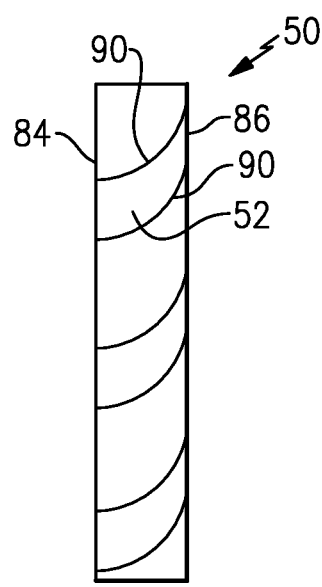
FIG. 4B illustrates a side view of the turbine disk including a plurality of curved slots.

FIGS. 4A and 4B show a front view and a side view, respectively, of an exemplary turbine disk 50. The turbine disk 50 includes a first face 84, an opposing second face 86, and an outer perimeter surface 94 that extends between the first face 84 and the opposing second face 86. A plurality of curved blade retention slots 52 extend from the first face 84 and the opposing second face 86 of the turbine disk 50. An opening 98 of the curved slots 52 on the outer perimeter surface 94 of the turbine disk 50 is defined by two substantially curved lines 90. Curved walls 96 that extend from the first face 84 to the opposing second face 86 of the turbine disk 50 define the curved slots 52. In one example, the curved lines 90 are each an arc or a portion of a circle.

Figure 12:
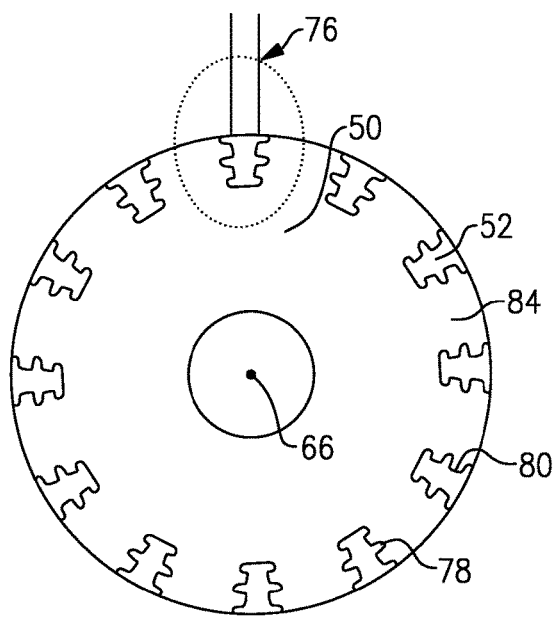
FIG. 12 illustrates a front view of the turbine disk showing the machining of the shape of the curved slots.

Each of the plurality of curved slots 52 receives the curved base 44 of one of the turbine blades 24. Each of the plurality of curved slots 52 is formed by a two step process. In the first step, a curved pre-slot 56 is formed. In the second step, the curved pre-slot 56 is finished to form the curved slot 52. The curved slot 52 includes a plurality of fingers 78 and grooves 80 (as shown in FIG. 12) and has a profile that matches the profile of the curved base 44 of the turbine blade 24.

Figure 5:
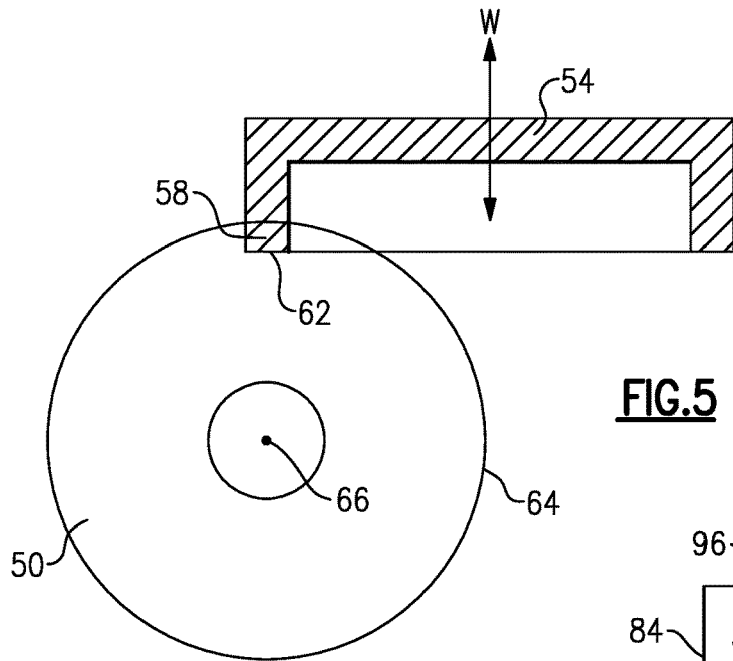
FIG. 5 illustrates a front view of the turbine disk with a cup-type forming tool positioned to form a curved pre-slot.
Figure 7:
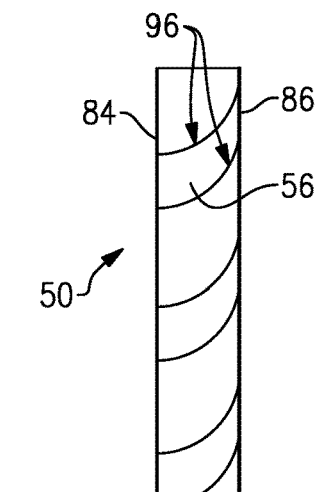
FIG. 7 illustrates a side view of the turbine disk including curved pre-slots.
Figure 6:
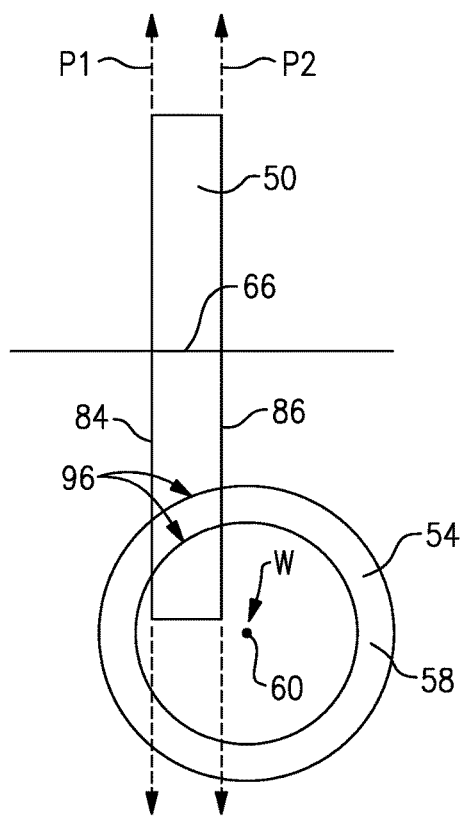
FIG. 6 illustrates a side view of the turbine disk with the cup-type forming tool positioned to form the curved pre-slot.
Figure 8:
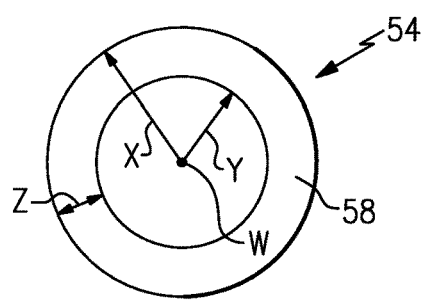
FIG. 8 illustrates a bottom view of the cup-type forming tool.
Figure 9:
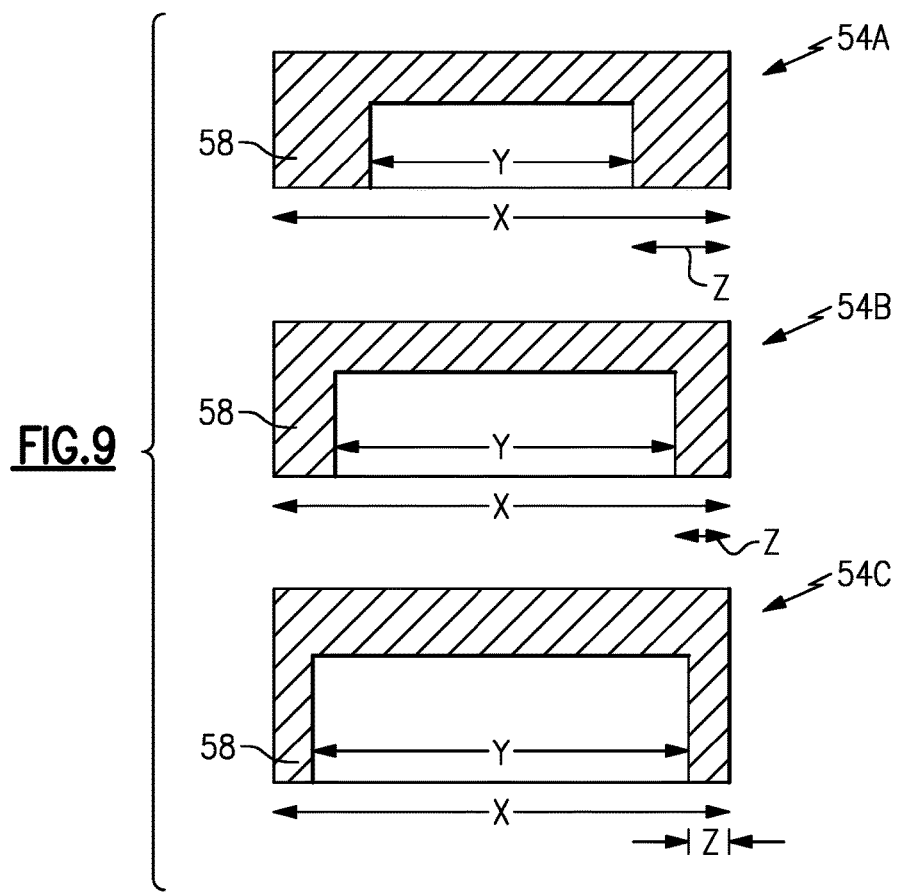
FIG. 9 illustrates several different cup-type forming tools.

As shown in FIGS. 5 and 6, in a first step, a cup-type forming tool 54 forms the pre-slot 56 in the turbine disk 50 (as shown in FIG. 7). The first step defines the location of the curved slots 52 and forms the general shape. As shown in FIG. 8, the cup-type forming tool 54 has a generally circular shape and a circumferential portion 58 having a thickness Z. The circumferential portion 58 has an inner diameter Y and an outer diameter X defined from a central axis W of the cup-type forming tool 54. The cup-type forming tool 54 may include a grinding wheel, a plated cubic boron nitride (CBN) wheel, a vitrified cubic boron nitride wheel, an inserted milling cutter or the like. As shown in FIG. 9, the pre-slot 56 can be formed by a variety of different shaped cup-type forming tools 54A, 54B and 54C each having a different thickness Z.

Figure 10:
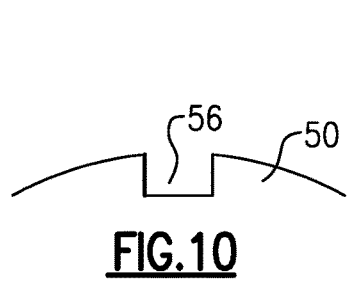
FIG. 10 illustrates a front view of the turbine disk showing the curved pre-slot.

The cup-type forming tool 54 is positioned at a desired location relative to the turbine disk 50. An end surface 62 of the circumferential portion 58, which defines a substantially circular ring, contacts a periphery 64 of the outer perimeter surface 94 of the turbine disk 50 and rotates about the central axis W of the cup-type forming tool 54. The cup-type forming tool 54 is then moved radially inward towards a central axis 66 of the turbine disk 50 to form a u-shaped pre-slot 56 (shown in FIG. 10) that includes substantially arcuate shaped opposing walls. The arcuate shaped pre-slot 56 extends between the faces 84 and 86 of the turbine disk 50 (as shown in FIG. 7). The shape of the pre-slot 56 corresponds to the shape of the portion of the circular circumferential portion 58 of the cup-type forming tool 54 that forms the pre-slot 56. After the pre-slot 56 formed, the cup-type forming tool 54 is removed from the pre-slot 56. In the example of FIG. 6, the face 84 defines a first plane P1 and the face 86 defines a second plane P2, and a center of curvature 60 of the curved walls 96 is at a location outside of an area between the planes.

Next, the turbine disk 50 and/or the cup-type forming tool 54 is moved relative to the other to position the cup-type forming tool 54 at a desired location relative to the turbine disk 50. Another pre-slot 56 can then formed in the turbine disk 50. The location of the cup-type forming tool 54 relative to the turbine disk 50 determines the orientation of the curved pre-slots 56 on the turbine disk 50. The diameters X and Y of the cup-type forming tool 54 determine the curvature of the pre-slots 56.

Figure 11:
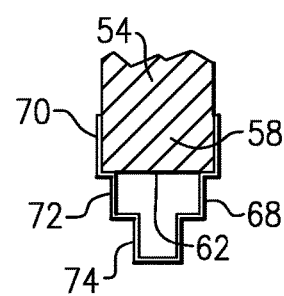
FIG. 11 illustrates a step portion added to the cup-type forming tool.

As shown in FIG. 11, in another example, a step portion 68 is positioned on the circumferential portion 58 to add additional contours to the curved pre-slot 56. In one example, the step portion 68 includes a first portion 70, a second portion 72 and a third portion 74. The first portion 70 has a diameter greater than the second portion 72, and the second portion 72 has a diameter greater than the third portion 74.

Figure 13:
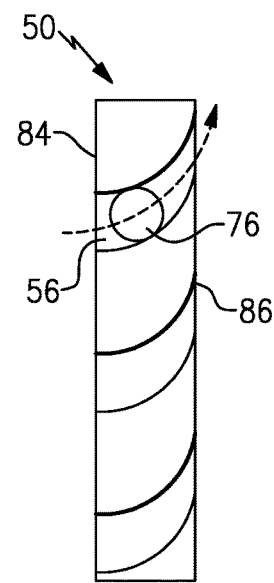
FIG. 13 illustrates a side view of the turbine disk showing the machining of the shape of the curved slots.

In a second step, as shown in FIG. 12, the curved pre-slot 56 is finished with a profiled finger type finishing tool 76 to form the curved slots 52. That is, the second step defines the profile of the curved slot 52. The profiled finger type finishing tool 76 may include a plated CBN tool, a vitrified CBN tool, a profiled end mill cutter or the like. As shown in FIG. 13, the finger type finishing tool 76 moves along the curved pre-slot 56 in the path shown in the dashed line to form the final shape of the curved slots 52 that includes the plurality of fingers 78 and the grooves 80. The profiled finger type finishing tool 76 provides the pre-slot 56 with a shape that corresponds to the shape of the curved base 44 of the turbine blade 24. Alternately, multiple tools can be used to achieve the final shape of the slot profile.

Figure 14:
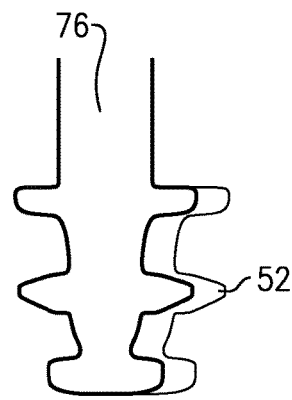
FIG. 14 illustrates the machining of one side of the curved slot.
Figure 15:
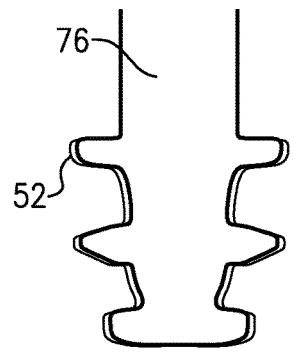
FIG. 15 illustrates the simultaneous machining of both sides of the curved slot.

In one example shown in FIG. 14, the profile machining can be achieved by machining one side of the curved pre-slot 56 at a time. Alternatively, as shown in FIG. 15, the profile machining can be achieved by simultaneously machining both sides of the curved pre-slot 56 at the same time.

After machining, the curved slots 52 of the turbine disk 50 have the same shape and curvature as the curved base 44 of the turbine blade 24. When the turbine blade 24 is to be installed in the turbine disk 50, the curved base 44 of the turbine blade 24 is aligned with the curved slots 52. The fingers 25 of the turbine blade 24 align with the grooves 80 of the curved slot 52, and the grooves 23 of the turbine blade 24 align with the fingers 78 of the curved slot 52. The turbine blade 24 is then slid relative to the turbine disk 50 to install the turbine blade 24 in the curved slot 52 of the turbine disk 50.

Compared to straight pre-slots of the related prior art, the exemplary curved slots 52 facilitate reducing the stresses on the blade attachment and the curved slots 52, facilitating increasing the retention capability of the turbine blade 24 in the turbine disk 50, and facilitating reducing the size, weight and cost of the gas turbine engine 10.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A turbine disk comprising:
a body portion including a first face that defines a first plane, an opposing second face that defines a second plane, and an outer circumferential surface extending between the first face and the opposing second face; and a curved slot in the body portion that extends between the first face and the opposing second face, wherein the curved slot is defined by a first curved wall and a second curved wall, wherein the first curved wall and the second curved wall each extend between the first face and the opposing second face, and the curved slot receives a portion of a turbine blade, and wherein the first curved wall and the second curved wall have a center of curvature that is at a location outside an area between the first and second planes.

2. The turbine disk as recited in claim 1 wherein the curved slot defines an opening of the curved slot, and the opening is on an outer perimeter surface and is defined by a first curved line at a first intersection of the first curved wall and the outer circumferential surface and a second curved line at a second intersection of the second curved wall and the outer circumferential surface.

3. The turbine disk as recited in claim 2 wherein the first curved line and the second curved line are a portion of a circle.

4. The turbine disk as recited in claim 1 wherein a bottom wall is located between the first curved wall and the second curved wall.

5. The turbine disk as recited in claim 4 wherein an entirety of the first curved wall and an entirety of the second curved wall are substantially perpendicular to the bottom wall.

6. The turbine disk as recited in claim 1 wherein the curved slot includes a plurality of fingers and grooves.

7. The turbine disk as recited in claim 1 wherein a distance between the first curved wall and the second curved wall defines a width of the curved slot, and the width is constant for an entire curved distance of the curved slot.

8. The turbine disk as recited in claim 7 wherein the distance between the first curved wall and the second curved wall is constant along an entire height of the curved slot.

9. The turbine disk as recited in claim 1, wherein the first curved wall and the second curved wall have the same center of curvature.

10. A turbine comprising:

a turbine disk including a body portion including a first face that defines a first plane, an opposing second face that defines a second plane, and an outer circumferential surface extending between the first face and the opposing second face, the turbine disk including a curved slot in the body portion that extends between the first face and the opposing second face, wherein the curved slot is defined by a first curved wall and a second curved wall, wherein the first curved wall and the second curved wall each extend between the first face and the opposing second face and have a center of curvature that is at a location outside an area between the first and second planes, and wherein the curved slot receives a portion of a turbine blade; and a turbine blade having a curved base, wherein a curvature of the curved base of the turbine blade corresponds to a curvature of the first and second curved walls of the turbine disk, and the base of the turbine blade is received in the curved slot of the turbine disk.

11. The turbine as recited in claim 10 wherein the curved slot defines an opening of the curved slot, and the opening is on an outer perimeter surface and is defined by a first curved line at a first intersection of the first curved wall and the outer circumferential surface and a second curved line at a second intersection of the second curved wall and the outer circumferential surface.

12. The turbine as recited in claim 11 wherein the first curved line and the second curved line are a portion of a circle.

13. The turbine as recited in claim 10 wherein a bottom wall is located between the first curved wall and the second curved wall.

14. The turbine as recited in claim 13 wherein an entirety of the first curved wall and an entirety of the second curved wall are substantially perpendicular to the bottom wall.

15. The turbine as recited in claim 10 wherein the curved slot includes a plurality of fingers and grooves.

16. The turbine as recited in claim 10 wherein a distance between the first curved wall and the second curved wall defines a width of the curved slot, and the width is constant for an entire curved distance of the slot.

17. The turbine as recited in claim 16 wherein the distance between the first curved wall and the second curved wall is constant along an entire height of the curved slot.

18. The turbine as recited in claim 10 wherein the curved slot includes at least one finger and at least one groove and the curved base of the turbine blade includes at least one finger and at least one groove, wherein the at least one finger of the base of the turbine blade is received in the at least one groove of the curved slot and the at least one finger of the curved slot is received in the at least one groove of the base of the turbine blade.

19. The turbine as recited in claim 10 further including a plurality of slots and a plurality of turbine blades, wherein one of the plurality of turbine blades is received in each of the plurality of slots of the turbine disk.

20. The turbine as recited in claim 10, wherein the first curved wall and the second curved wall have the same center of curvature.

* * * * *